Oct. 30, 1928.
M. L. WATERMAN ET AL
1,689,310
LUBRICATING MEANS FOR SEWING MACHINES
Filed April 23, 1926
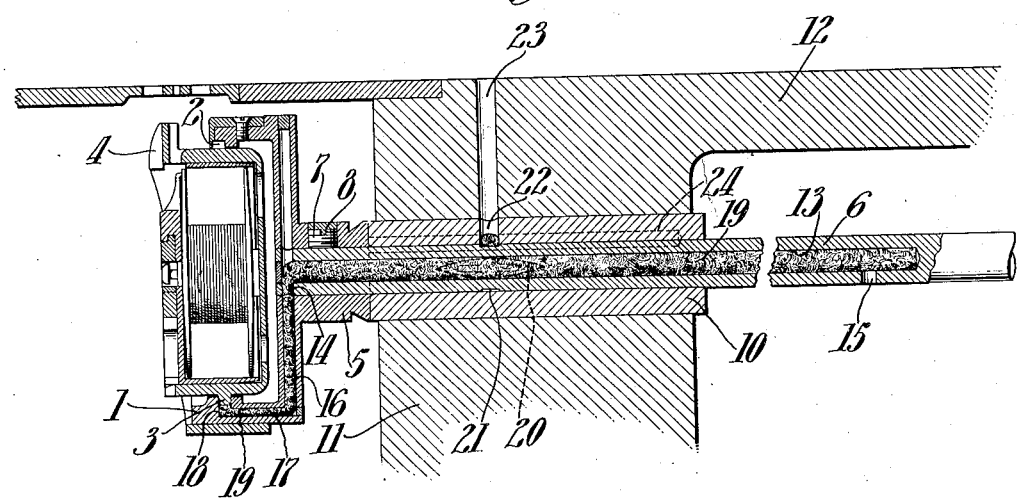
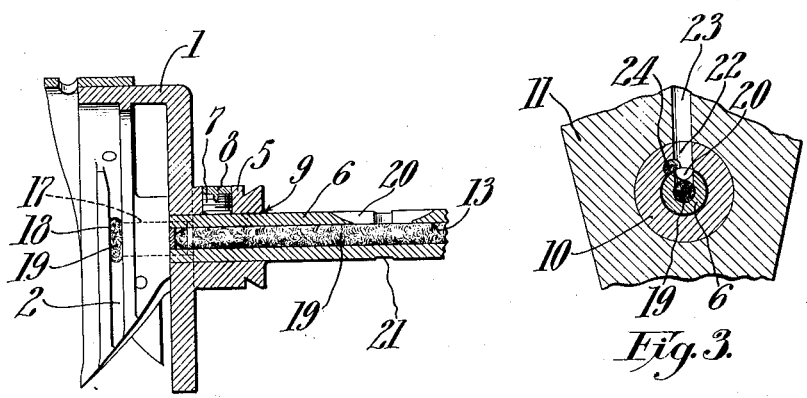
INVENTOR
Max L. Waterman and
BY George A. Fleckenstein
WITNESSES.
ATTORNEY Patented Oct. 30, 1928.

1,689,310

UNITED STATES PATENT OFFICE.

MAX L. WATERMAN, OF FAIRFIELD, AND GEORGE A. FLECKENSTEIN, OF STRATFORD, CONNECTICUT, ASSIGNORS TO THE SINGER MANUFACTURING COMPANY, OF ELIZABETH, NEW JERSEY, A CORPORATION OF NEW JERSEY.

LUBRICATING MEANS FOR SEWING MACHINES.

Application filed April 23, 1926. Serial No. 104,027.

This invention relates to improvements in the means for lubricating the bobbin-case raceways of high speed sewing machine looptakers, and has for its primary object to provide means insuring the constant presence of a lubricant in the bobbin-case raceways and to so control the lubricant supply as to practically obviate the soiling of the thread.

In its preferred embodiment, the present invention has been applied to a rotary looptaker body having a raceway therein for the bearing rib of a stationary bobbin-case. The loop-taker body is permanently secured upon a rotary shaft provided with a longitudinal bore extending the major portion of the length of the shaft from the loop-taker end thereof. Communicating with the shaft-bore adjacent each end thereof is a radial shaft-bore of which one is in alinement with a loop-taker body radial bore communicating with the bobbin-case raceway. Threaded into the connecting shaft and loop-taker bores so as to terminate in said raceway is a continuous piece of lubricant conducting material or wicking, which wicking is more tightly compressed in the radial bore of the loop-taker body than in the shaft-bore by relatively constricting said radial-bore. This construction insures a free but conducted feed of lubricant in the shaft-bore and controls the feed of the lubricant through the relatively compessed wicking of the loop-taker radial-bore, which feed is otherwise likely to be so free as to endanger soiling of the thread by reason of the centrifugal action incidental to the high speed rotations of the loop-taker.

A lubricant supply inlet leads from the upper surface of the machine bed-plate through the shaft-bearing and its bushing to a slot in the shaft. In order to insure proper lubrication of the shaft-bearing, the bushing is provided with a longitudinal bore intersecting said inlet and communicating throughout its length with the shaft-bearing, which bushing-bore is preferably although not necessarily provided with wicking. The inlet slot in the shaft is so disposed peripherally thereof as to be in alinement with the bearing inlet in the normal stopping position of the machine, said shaft being provided with a peripheral groove intersecting said slot to still further insure entrance of lubricant in the shaft bore.

In the accompanying drawings, Fig. 1 is a vertical longitudinal section through the loop-taker and its shaft, showing a portion of the bed-plate. Fig. 2 is a section on the line A—A, of Fig. 1, with the bobbin-case removed from the loop-taker. Fig. 3 is a section on the line B—B, of Fig. 1.

Referring to the drawings, the numeral 1 indicates a loop-taker body provided with a raceway 2 for the peripheral bearing rib 3 of a bobbin-case 4. Said body 1 is formed with a hub 5 permanently secured upon the forward end of a rotary shaft 6, the securing means shown comprising a plurality of set-screws 7 which are covered by solder 8. The free end of the hub 5 is also preferably soldered to the shaft as at 9 to seal it against the passage of lubricant between the hub and the shaft. The shaft 6 is journaled in a bushing 10 fixedly secured in any suitable manner in a bearing lug 11 below the machine bedplate 12.

The shaft 6 is provided with a longitudinal bore 13 extending from the loop-taker end of the shaft throughout the major portion of the length thereof and is also provided with radial apertures 14 and 15 adjacent opposite ends of said bore. The aperture 14 is in alinement with a radial bore 16 in the loop-taker body 1, which bore 16 is constricted relatively to the shaft-bore 13 and communicates at its outer end with a wider duct 17 formed in the peripheral portion of the loop-taker body in a direction substantially parallel to the axis of rotation of the loop-taker. The duct 17 in the present instance terminates in a slot 18 provided in the base of the raceway 2. A continuous piece of lubricant conducting material or wicking 19 is threaded into the connecting shaft and loop-taker bores so as to terminate in the raceway slot 18 and it will be apparent that lubricant may be freely conducted by the relatively uncompressed portion of the wicking 19 in the shaft-bore to the portion of the wicking in the constricted radial bore 16 which wicking portion is relatively compressed and thereby prevents a too free feed of the lubricant through said radial bore under the centrifugal action incidental to high speed rotation of the loop-taker. The widened duct 17 permits of the spreading of the end of the wicking 19 to efficiently lubricate the raceway through its slot 18.

Intermediate its ends, the shaft 6 is provided with a beveled inlet-slot 20 which is intersected by a peripheral groove 21 on the shaft tending to conduct lubricant to said slot 20. In the normal stopping position of the machine, the shaft-slot 20 is in alinement with a duct 22 in the bushing 10, which duct 22 is in permanent alinement with an inlet duct 23 in the machine bed-plate. Intersecting the duct 22, in part, is a bore 24 provided longitudinally in the bushing 10, which bore 24 communicates with the shaft bearing aperture of said bushing and is preferably provided with wicking. This construction insures an efficient lubrication of the shaft-bearing without interfering with the supply of lubricant to the wicking 19.

Having thus set forth the nature of the invention, what we claim herein is:—

1. In a sewing machine, a rotary loop-taker body provided with a substantially radial bore, a bobbin-case raceway in said body, a duct relatively wide with respect to said radial bore connecting the bore with said raceway, and lubricant-conducting wicking compressed in said bore extending through said duct to the raceway.

2. In a sewing machine, a rotary loop-taker body provided with a substantially radial bore, a bobbin-case raceway in said body provided with a slot in the base portion thereof, a duct connecting said radial bore with the raceway slot, and a single piece of lubricant-conducting wicking extending from the inner end of said radial bore into the raceway slot.

3. In a sewing machine, a rotary loop-taker body having a bobbin-case raceway, a loop-taker carrying shaft provided with a longitudinal bore, a radial bore in said body constricted relatively to the shaft bore and communicating with said shaft-bore and the raceway, and a continuous piece of wicking in said shaft-bore extending through said radial bore to substantially the bobbin-case raceway.

4. In a sewing machine, a rotary shaft having a longitudinal bore, a loop-taker permanently secured upon one end of said shaft comprising a cup-shaped body provided with a thread-cavity having an annular-raceway and a radial bore communicating with said race-way, a bearing member provided with a bearing aperture for one end of said shaft having a transverse duct communicating with the shaft-bore, said bearing also having a longitudinal bore intersecting said transverse duct and communicating with the bearing aperture for the shaft.

5. In a sewing machine, a rotary shaft having a longitudinal bore and a lubricant inlet, a loop-taker body carried by said shaft having an annular raceway and a radial bore communicating with said raceway, a continuous piece of wicking disposed in the shaft bore extending through said radial bore to the race-way, and a bearing member provided with a bearing aperture for one end of said shaft having a duct adapted to directly communicate with said inlet in the normal stopping position of the shaft, said bearing member also having a bore intersecting said duct and communicating with said bearing aperture for the shaft.

In testimony whereof, we have signed our names to this specification.

MAX L. WATERMAN.
GEORGE A. FLECKENSTEIN.